(No Model.)
F. B. QUIMBY.
FOCUSING ATTACHMENT FOR PHOTOGRAPHIC INSTRUMENTS.
No. 439,556. Patented Oct. 28, 1890.
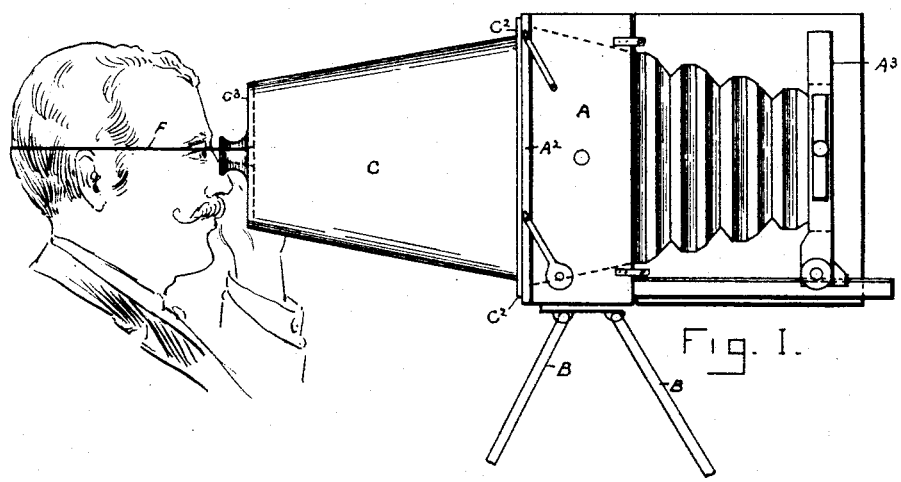
Fig. 1.
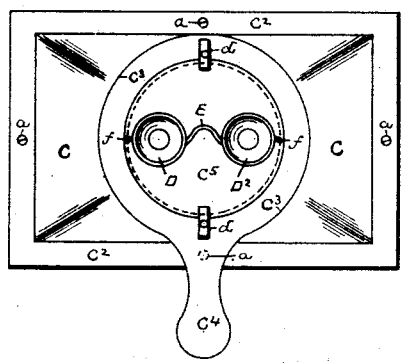
Fig. 2.
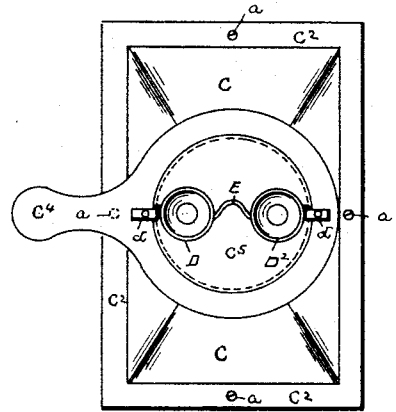
Fig. 3.
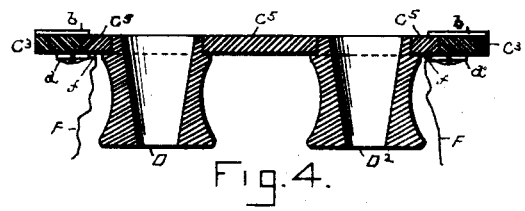
Fig. 4.
Fig. 5.
WITNESSES::
Geo. E. Bent
Frank G. White
INVENTOR::
Frederick B. Quimby
by his Attorneys
Brown Bros

UNITED STATES PATENT OFFICE.

FREDERICK B. QUIMBY, OF QUINCY, MASSACHUSETTS.

FOCUSING ATTACHMENT FOR PHOTOGRAPHIC INSTRUMENTS.

SPECIFICATION forming part of Letters Patent No. 439,556, dated October 28, 1890.

Application filed September 19, 1889. Serial No. 324,429. (No model.)

*To all whom it may concern:*

Be it known that I, FREDERICK B. QUIMBY, a citizen of the United States of America, and a resident of the city of Quincy, in the county of Norfolk and State of Massachusetts, have invented a new and Improved Focusing Attachment for Photographic Instruments, &c., of which the following is a full, clear, and exact description.

In the taking of photographs the camera is first brought to focus, and then the sensitized plate inserted and exposed.

In focusing the camera, as well known, the camera is brought to proper adjustment, determined by the representation of the picture to be taken on a focusing-screen, which at the time and also the vision of the operator are shut off from all light except that coming through the lens of the camera. Heretofore this has been accomplished by means of a focusing-cloth, enveloping the operator's head and the camera.

The object of this invention is to dispense with the focusing-cloth as heretofore used with all its attendant and well-known disadvantages; and to that end it consists, in substance, in the combination, with the focusing-screen of the camera, of a hood or bonnet surrounding and attached to it on all sides, preferably detachably attached by screws or otherwise, and having at its end opposite to the screen two separated and projected sockets at which to place the operator's eyes, and such, for illustration, as are used in opera and field glasses, and all so that while the operator is focusing the camera the focusing-screen is shielded from the light, except such as enters thereto through the lens of the camera, substantially as hereinafter described.

Furthermore, the invention consists in an attachment of the hood or bonnet whereby it can be held in the hand or rested on the nose or secured about the head of the operator, but in all cases without enveloping the head.

In the drawings forming part of this specification, Figure 1 is a side view, on a reduced scale, of a camera and of the improved hood or bonnet attachment thereof. Fig 2 is a front face view of the sighting end of the hood with the eye-sockets in position for a horizontal picture; and Fig. 3 is a similar view to Fig. 2, with the eye-sockets in position for a vertical picture. Fig. 4 is a horizontal section, full size, line 4 4, Fig. 2. Fig. 5 is a detail view, as hereinafter appears.

In the drawings, A is a camera-box of the form known as a "bellows camera," and B is the tripod support, broken off. The camera A in none of its parts forms any part of this invention, and, as usual, at its end $A^2$ it is provided with a focusing-screen, (not shown,) and at its end $A^3$ with a lens. (Not shown.) C is the body portion of the hood or bonnet. The body C, preferably, tapers from end to end and is made of flexible material—such as cloth—impervious to light. The hood at its larger end is attached to a wooden frame $C^2$ of suitable shape and size to surround the camera at the focusing-screen, and to be attached by screws $a$ or other suitable fastening means to the camera. The hood at its smaller end is secured to an annular wooden frame $C^3$, having a handle $C^4$ at one side thereof. $C^5$ is a circular wooden plate fitting within the annular frame $C^3$, and, by an overlapping flange $b$ at the inner side and swinging buttons $d$ at the outer side of said frame, confined against escape from, while free to be rotated in and to be removed from, the annular frame. The circular plate $C^5$ has two separated eye tubular sockets D $D^2$ projected therefrom and at suitable distances apart for the eyes of the operator. These sockets in either position of the camera—that is, for a vertical or horizontal picture—are horizontal, and are changed for the position desired by rotating their carrying-plate $C^5$ suitably therefor on the annular frame $C^3$. The sockets, as shown, have a bridge-piece E connecting them for their rest on the bridge of the nose of the operator when his eyes are applied to the socket. Again, the annular frame may have a strap or cord F detachably attached at its opposite ends to hooks or eyes $f$ of the plate $C^5$ for encompassing the head of the operator, passing over and resting on the tops of the ears, as shown in Fig. 1. The handle $C^4$ of the annular frame is for convenience in handling and holding the hood.

The use of the hood or bonnet with its separated and projected eye tubular sockets, all as described, is obvious from the description given and illustration, particularly Fig. 1 of the drawings, and needs no especial explanation; and it is manifest that all light is excluded from the focusing-screen of the camera, except in so far as it is admitted thereto through the lens of the camera, and, again, that because of the projection and separation of the eye-sockets, all as described and shown, the eyes can be placed in close proximity to them and to the best advantage as to sighting and excluding the passage of light through the sockets.

It is obviously preferable to use two separated and projected eye tubular sockets, and this combination constitutes one of the features of this invention; but only one, Fig. 5, if so desired, may be used in connection with the other features of the invention, as hereinbefore explained. Again, the said sockets may be immovable as to the hood; but it is preferable to have them movable, as and for the purpose stated.

The hood may be made of inflexible material; but, plainly, flexible material is preferable, as it is collapsible for convenience in storing when not in use. Again, the hood may be straight instead of tapering, and circular in cross-section in lieu of square sided, as particularly shown.

Having thus described my invention, what I claim, and desire to secure by Letters Patent, is—

1. An attachment for photographic cameras, composed of a hood or bonnet, means for attachment of the hood at and about the focusing-screen or plate, and two separated and projected eye-sockets held on the hood at its end opposite to that attached at the focusing screen or plate, substantially as described, for the purposes specified.

2. An attachment for photographic cameras, &c., composed of a hood or bonnet, means at one end of the hood for the attachment of the hood at and about the focusing-screen or plate of the camera, and two separated and projected eye-sockets joined by a nose-bridge held on the hood at its end opposite to that attached to camera, substantially as described, for the purposes specified.

3. An attachment for photographic cameras, &c., composed of a hood or bonnet, means at one end of the hood for the attachment of the hood at and about the focusing-screen or plate of the camera, an eye socket or sockets held on the hood at its end opposite to that attached to camera, and a cord held on the hood, substantially as described, for the purposes specified.

4. An attachment for photographic cameras, &c., composed of a hood or bonnet, means at one end of the hood for the attachment of the hood at and about the focusing-screen or plate of the camera, an eye socket or sockets held on the hood at its end opposite to that attached to camera, and a handle held on the hood, substantially as described, for the purposes specified.

In testimony whereof I have hereunto set my hand in the presence of two subscribing witnesses.

FREDERICK B. QUIMBY.

Witnesses:
ALBERT W. BROWN,
GEO. C. BENT.